United States Patent [19]
Hessmert

[11] 3,889,092
[45] June 10, 1975

[54] APPARATUS FOR SELECTIVELY MACHINING INTERFITTING PARTS

[75] Inventor: Gustav Adolf Hessmert, Ludenscheid, Westfalen, Germany

[73] Assignee: Gustav Hessmert K.G., Ludenscheid, Germany

[22] Filed: June 11, 1973

[21] Appl. No.: 368,466

[30] Foreign Application Priority Data
June 29, 1972 Germany............................ 2231800

[52] U.S. Cl. ............................. 219/69 R; 219/69 R
[51] Int. Cl. .............................................. B23p 1/08
[58] Field of Search .... 219/69 R, 69 V, 69 M, 69 E

[56] References Cited
UNITED STATES PATENTS

| | | | |
|---|---|---|---|
| 2,974,215 | 3/1961 | Inoue | 219/69 M |
| 3,550,479 | 12/1970 | Pfaff, Jr. | 219/69 M |
| 3,663,785 | 5/1972 | Hausermann | 219/69 UX |

*Primary Examiner*—Bruce A. Reynolds
*Attorney, Agent, or Firm*—Beaman & Beaman

[57] ABSTRACT

Apparatus for selectively machining interfitting parts such as tools and moulds wherein the apparatus permits the parts to be preliminarily interfitted, and selectively positions the parts for either mechanical machining or spark-erosion machining. After preliminary interfitting movable support means for the parts is selectively positioned as determined by the type of machining to occur. The apparatus includes spark-erosion equipment directly permitting the parts to be spark-erosion machined after preliminary fitting, and dual support means translating apparatus is employed to support the upper fitted part.

7 Claims, 5 Drawing Figures

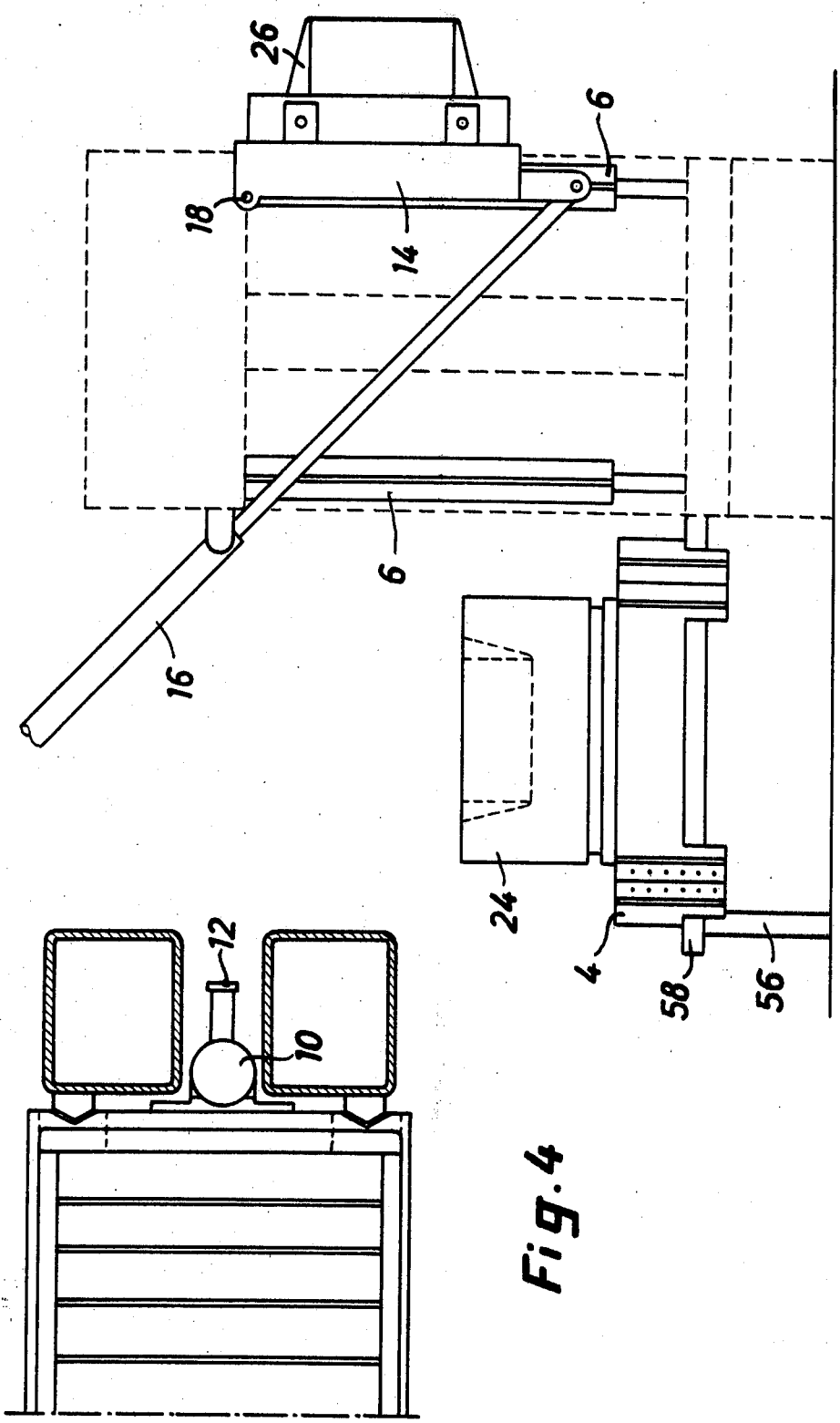

APPARATUS FOR SELECTIVELY MACHINING INTERFITTING PARTS

BACKGROUND OF THE INVENTION

The invention relates to a device for spot-grinding and fitting operations in the manufacture of tools and moulds, with the aid of which two workpiece parts, which are to have material removed in a mutually adapted manner, and in particular an upper and lower mould which are to be joined together sealingly in the region of a joint when in use, can be moved up to, and pressed against, one another in a predetermined attitude relative to one another.

In the manufacture of tools and moulds, devices of this kind are used by spot-grinding presses or devices which, in essence, differ from one another only in respect of the contact pressure which can be achieved. Under these circumstances, it is possible to adopt, for example, the procedure of fastening the two workpiece parts which are to be fitted to one another, to the table and ram plate, respectively, of a hydraulic spot-grinding press in precisely aligned attitudes relative to one another, coating the surfaces which are to be made to fit one another with spot-grinding pigment, and pressing the two workpiece parts against one another by extending the ram plate with a prescribed amount of force. After the two workpiece parts have been separated from one another by retraction of the ram plate, it is possible to see, from the markings left behind on the fitting surfaces by the spot-grinding pigment, at which points material has still to be removed in order to improve the fit. This removal of material may be carried out in any desired manner, for example by filing, grinding, electro-erosion, etc. The spot-grinding process is then repeated, and if the result again seems to be in need of improvement, further material is removed; and these processes are repeated, in their entirety, until the desired accuracy of fit is achieved. As regards the choice of operations used for the removal of material, the rule which generally applies is that relatively large corrections, such as are particularly necessary at the start of the spot-grinding and fitting operations, are preferably performed by tools which remove material mechanically, whereas fine corrections are preferably carried out by electro-erosion using spark-erosion machines. Both hydraulic spot-grinding presses or devices and spark-erosion machines for the manufacture of tools and moulds are known in a multitude of designs, and are used even for large workpieces or mould parts; for example, commercial spot-grinding presses which can be supplied on a mass-production basis and are intended for the manufacture of moulds, can operate with adjustable pressures of between 0 and 200 Mp for workpieces having dimensions of 2 × 2 × 0.5 m, and correspondingly dimensioned spark-erosion machines for the manufacture of tools and moulds can likewise be obtained from catalogues.

It is obvious that the spot-grinding and fitting operations described may be extremely costly in terms of time and labour, depending upon the degree of complexity of the surfaces to be fitted, and upon the quality of the manual work. Extreme difficulties often arise in the fitting of open surfaces, sealing edges, flash edges, etc., and special skill on the part of the spot-grinding operator, and numerous spot-grinding and machining processes, are required in order to overcome these difficulties. This is particularly the case in the manufacture of press and injection moulds, where burr-free products are required, and this in the case of highly complex parts.

Since the costs of press and injection mouldings are greatly influenced, particularly in the case of relatively small production runs, by the tooling costs, that is to say the costs involved in the manufacture of the moulds, it is extremely desirable that the outlay in terms of time and labour for the manufacture of the moulds and, in this connection, particularly for the spot-grinding and fitting of the mould parts, should be kept as low as possible; however, this also seems highly desirable because, as the working and setting-up time per mould or tool is reduced, the efficient utilization of the particular mechanical arrangements available can be improved.

The starting point for the invention is therefore the problem of generally reducing the outlay required for the spot-grinding and fitting operations described, that is to say in respect of both the working and setting-up time and the space and capital expenditure required.

SUMMARY OF THE INVENTION

The object of the invention is to provide a device for spot-grinding and fitting operations in the manufacture of tools and moulds, said device comprising means for holding and moving together two workpiece parts which are to have material removed in a mutually adapted manner, and further comprising means for selective operation as a spark-erosion machine for marking and/or removing excess workpiece material which impedes the precise fitting together of said workpiece parts.

The device according to the invention thus permits both the customary mechanical or hydraulic spotgrinding after the fashion of a spot-grinding press or spot-grinding device, and also the removal of workpiece material by spark-erosion, such as is particularly expedient in the final or fine-machining stages of the fitting operations. In particular, the device according to the invention may also be used to obtain marker surfaces with the aid of the spark-erosion arrangement and without the need for applying any spotgrinding pigment. It is possible to produce marker surfaces very rapidly and without surface pressure by this so-called spot-grinding by spark-erosion (or "EDM spot-grinding"). This possibility is extremely advantageous, particularly in the case of mould parts made of hard material, for example steel, and/or in the event of shaped structures, and in particular thin webs, being present, which are difficult to spot-grind and can easily become deformed or damaged if high spot-grinding pressures are applied.

The device according to the invention can, without difficulty, be constructed in such a way that no re-clamping or setting-up operations of any kind, which are to be performed manually, are required in the transitions between mechanical or pressure spot-grinding, spot-grinding by spark-erosion, and removal of material by spark-erosion (EDM finish-spot-grinding), with the result that a very high saving in terms of setting-up times is possible, and dependence upon the accuracy of manual work is very greatly reduced.

All in all, the device according to the invention offers exceptional technical and economic advantages because of the possibility of performing the processes described, in the desired sequence or in combined working operations, on one and the same machine.

In a preferred form of construction, the device according to the invention further comprises a frame, a first and a second workpiece carrier which can be moved up to, and away from, one another in said frame in a prescribed path of motion and which are intended to receive the said two workpiece parts which are to be fitted to one another, clamping arrangements for fastening said workpiece parts to said workpiece carriers in mutually aligned attituudes, a controllable driving arrangement for producing a controllable relative movement of said workpiece carriers up to, and away from, one another in the prescribed path of motion, and for producing a contact pressure between the said workpiece parts, a third workpiece carrier which can be moved independently in the direction of the path of motion, said clamping arrangements being capable of being set up for selective alternation of the attachment of one workpiece part to said second workpiece carrier or to the third workpiece carrier, a controllable driving arrangement acting upon the third workpiece carrier, insulating means which insulate the two workpiece parts electrically from one another at least when one of these workpiece parts is fastened to the third workpiece carrier and is no longer connected to the said second workpiece carrier, and a spark-erosion arrangement which connects the electrical input source required for spark-erosion to the workpiece parts. In this preferred form of construction, it is possible, because of the presence of a separate and individually movable workpiece carrier for the spark-erosion process, to make those parts which are to be moved during the spark-erosion process relatively light, so that the spark-erosion process can be controlled with the high degree of accuracy desired; on the other hand, the second workpiece carrier, which serves for the mechanical spot-grinding, and also the parts associated with it, for example the associated driving arrangement, can, without difficulty, be constructed in such a way that even high contact pressures are possible. For example, in a machine of practical design in the preferred form of embodiment described, the weight of the parts (without tool parts) to be moved during the sparkerosion process may be about 3 megaponds (3 metric tons); in the mechanical or hydraulic spot-grinding, however, contact pressures of about 60 megaponds (60 metric tons) may be applied.

A particularly simple form of construction, which is modelled on the type of construction of conventional spark-erosion machines, may be characterized in that the spark- erosion arrangement has a connection head which is connected to the third toolpiece carrier.

A further advantageous development, in which, in particular, the mounting of the workpiece parts may be effected in a symmetrical manner in each case, both during the spark-erosion process and during the mechanical or hydraulic spot-grinding, is characterized in that the third workpiece carrier is disposed in a recess in the moving, second workpiece carrier. This form of construction can be still further simplified through the fact that the first workpiece carrier is mounted in the frame for movement in the direction of the path of motion; that is to say, the second workpiece carrier need not then be of displaceable construction.

The clamping arrangements are preferably constructed in a controllable manner, so that they can easily be actuated automatically within the scope of an automatically progressing over-all process, for example after the fashion of a follow-up control system. In fact all the driving and operating units connected with the individual mechanical or hydraulic movements and with the spark-erosion installation can be actuated and/or controlled from a common control panel.

In order to exclude any variations in the position of the workpiece carrier when the clamping-in of the one workpiece part is changed from the second to the third workpiece carrier, adjustable adapting means are preferably associated with the clamping arrangements, in a further development of the invention, so that the same clamped-in positions of the workpiece part are produced in both clamped-in conditions.

It is also of particular advantage if the workpiece parts can be conveniently machined after each individual partial step in the over-all process, for example after mechanical or hydraulic spot-grinding; to this end, provision is advantageously made, in a further development of the invention, for the first workpiece carrier to be movable out of the frame from a position which is remote from the second workpiece carrier, into a position in which a workpiece part located on the first workpiece carrier is easily accessible. Correspondingly, it is advantageous, in a further development of the invention, if the second workpiece carrier can also be moved out of the frame and into a position in which a workpiece part located on the second workpiece carrier is easily accessible. For this purpose, it is particularly advantageous if, in yet another development of the invention, the second workpiece carrier can be pivoted into the position in which it is moved out of the frame. In this event, the pivotable mounting arrangement is particularly simple if displaceability of the second workpiece carrier is dispensed with, as already described, and if therefore only the first workpiece carrier is made capable of to-and-fro movement in the path of motion, linearly in relation to the second workpiece carrier.

In the case of spot-grinding by spark erosion, but particularly in the case of removal of material by spark-erosion, it is expedient or necessary, as is already known, to seal off the operating gap from the surrounding environment and to cool the said gap; this is usually effected by means of a gaseous or liquid medium. In order to make this method of operation possible, provision may be made, in still a further development of the invention, for one of the workpiece carriers to be constructed as a trough which is open in the direction of the other workpiece carrier and in which a workpiece part located on the workpiece carrier can be completely immersed in a dielectric fluid for the purpose of the spark-erosion operation. So as not to unnecessarily impede the setting-up operations during the clamping of a workpiece part, it may be expedient, in a further development of the invention, for the trough to have at least one removable wall. Moreover, it is generally necessary or advantageous to agitate or circulate the dielectric fluid; accordingly, the trough may be incorporated in a circuit which circulates the dielectric fluid. For the purpose of switching-over from spark-erosion operation to mechanical or hydraulic operation, it is advantageous if means are provided for emptying the trough of the dielectric fluid.

It is particularly expedient for the last-mentioned arrangements, but also with regard to mechanical stability and adaptation to previously customary methods of operation, if the second workpiece carrier is disposed vertically above the first workpiece carrier.

According to the conception of the previous state of the art, the specialist engaged in spot-grinding and fitting operations had little hope of carrying out the customary mechanical spot-grinding (for example with spot-grinding presses) on the one hand, and spark-erosion working operations on the other, with one and the same machine, since the principles of operation are completely different from one another and, more particularly, the electrical equipment required in spark-erosion machines, especially the high-voltage and high-frequency generators, insulating arrangements and the arrangements necessary for the use of liquid or gaseous dielectric scavenging and protecting media, was regarded as incompatible with the basic design and method of operation of a conventional mechanical spot-grinding press or spot-grinding device. Mechanical spot-grinding presses or spot-grinding devices on the one hand, and spark-erosion machines on the other, were therefore always offered for sale and used as separate machines. By means of the present invention, however, any objections which might hitherto have stood in the way of combining the concepts of the two machines, can be overcome, and it is possible to arrive at quite exceptional advantages in respect of accuracy of operation, speed of operation, savings in setting-up time and savings in the capital expenditure and space required. Surprisingly, it proved to be the case that the provision of the device according to the invention involves relatively simple design possibilities, which also enable the combined machine according to the invention to be manufactured by a simple and economical method of construction.

BRIEF DESCRIPTION OF THE DRAWINGS

The invention will be described in greater detail below, by way of example, with reference to the accompanying drawings, in which:

FIG. 4 is a simplified sectional view along the line IV—IV in FIG. 1, and;

FIG. 5 is an illustration corresponding to that in FIG. 2, but with the first workpiece carrier extended and the second workpiece carrier pivoted outwards.

DESCRIPTION OF PREFERRED EMBODIMENT

Figure 1:
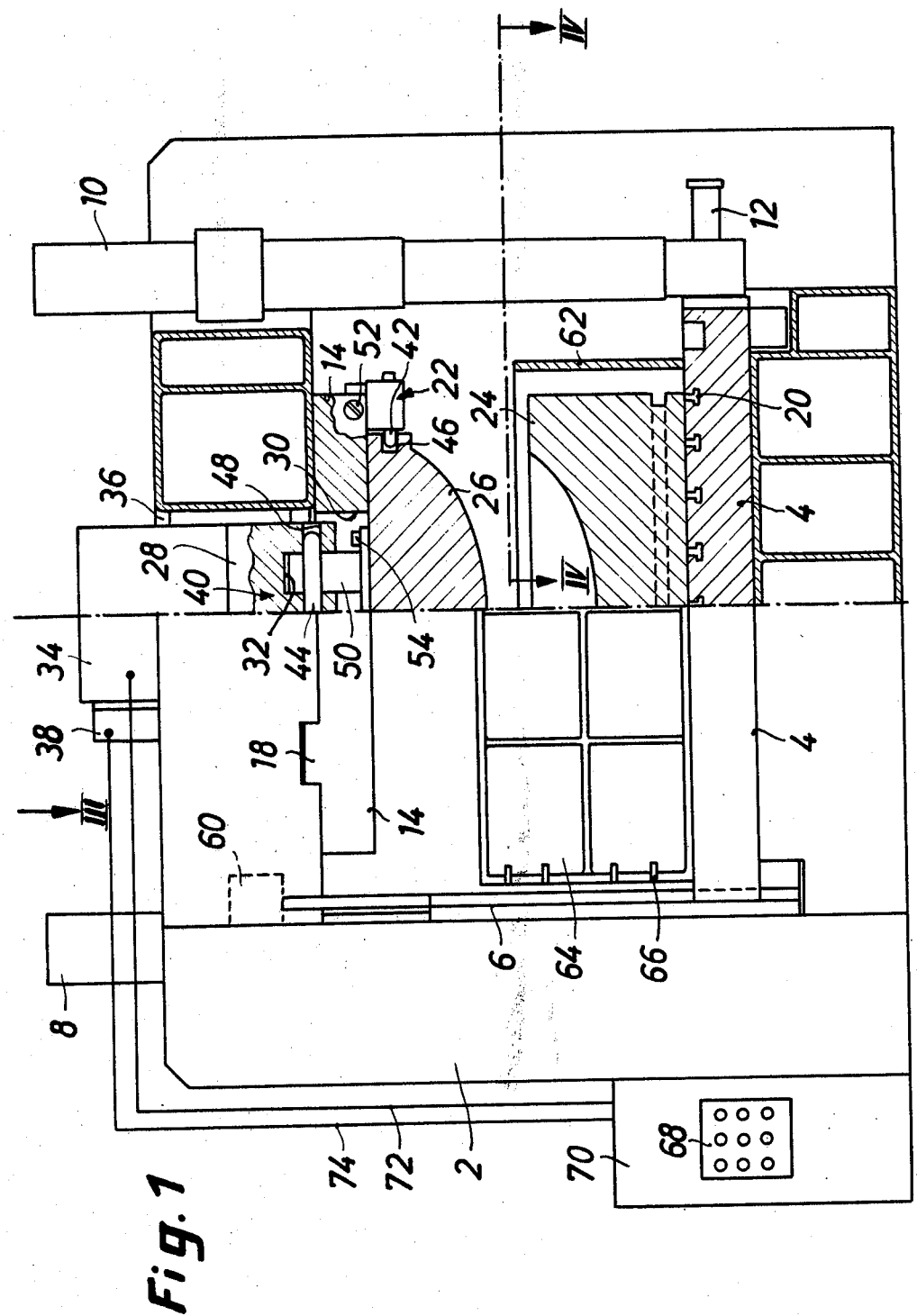
FIG. 1 is a partially cut-away diagrammatic side elevation of one embodiment of a device according to the invention, viewed from the operating side.

In its basic construction, the device illustrated in the drawings corresponds to a conventional hydraulic spot-grinding press or spot-grinding device and comprises a frame 2 which is constructed as a closed framework and in which a first workpiece carrier 4, which corresponds to the table of an ordinary spot-grinding press, can be moved, in a vertical path of motion, in vertical guide strips 6. For the purpose of moving the first workpiece carrier 4, use is made of a hydraulic driving device having two controllable hydraulic cylinders 8, 10, which are secured in the frame and can be coupled to the first workpiece carrier 4 via hydraulically releasable driving means 12.

Figure 2:
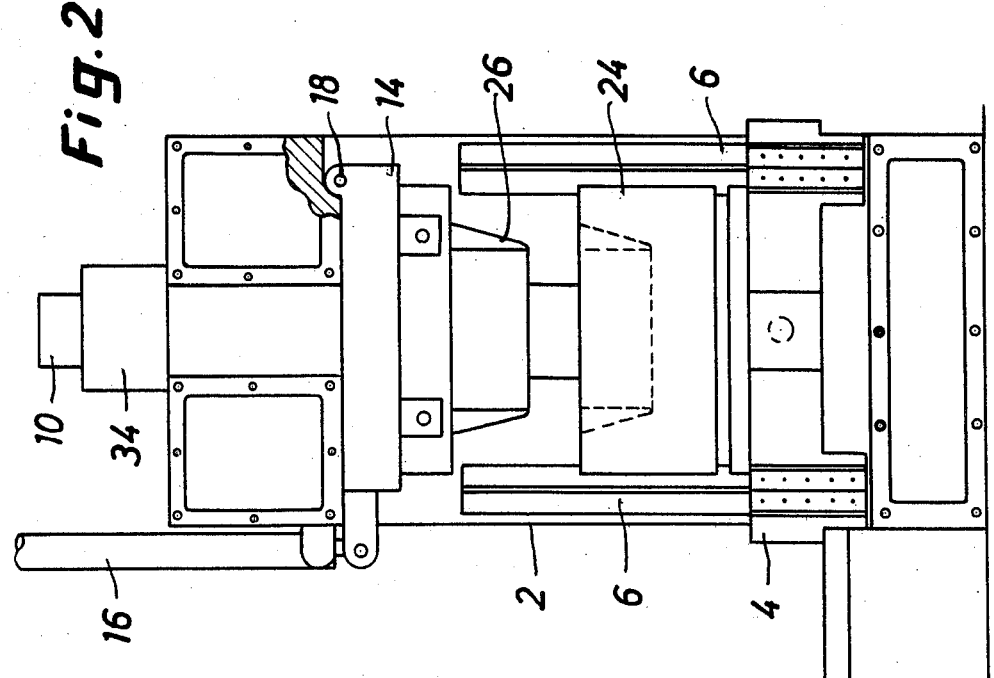
FIG. 2 is a diagrammatic side elevation, rotated by 90° compared with that in FIG. 1, of the device illustrated in FIG. 1, with parts of the support and other parts omitted.

A second workpiece carrier 14, which corresponds to the ram plate of an ordinary spot-grinding press, is mounted in the frame 2 at the top end of the vertical path of motion of the first workpiece carrier 4. The second workpiece carrier 14 can be pivoted, in the manner known from spot-grinding presses, out of the frame 2 and into the position shown in FIG. 5, about pivoting bearings 18 and by means of a hydraulic cylinder 16 (FIGS. 2 and 5).

Two workpiece parts 24 and 26 which are to be adapted to one another, are fastened, in positions which are precisely aligned in relation to one another, to the workpiece carriers 4 and 14 respectively, by means of clamping arrangements 20 and 22 respectively. In the drawings, the workpiece parts are shown as two halves of a mould which are to fit together sealingly in the course of their subsequent use. Naturally, the device is also suitable for machining other tools and moulds.

As a result of the raising and lowering of the first workpiece carrier 4 by means of the controllable hydraulic cylinders 8 and 10, the two workpiece parts 24 and 26 can be placed against one another, pressed against one another with an adjustable degree of force, and moved apart again.

A third workpiece carrier 28 can be moved right through a cut-out portion 30 in the second workpiece carrier 14, parallel to the path of motion of the first workpiece carrier 4. The third workpiece carrier 28 has cut-out portions 32 for receiving fastening elements, and is carried by the connection head 34 of a spark-erosion arrangement. The connection head 34 is guided for vertical movement in guides 36 on the frame 2, and can be brought into the desired vertical positions, and moved vertically, by means of an additional driving arrangement 38 which may operate, for example, electrically, or preferably hydraulically.

On the third workpiece carrier 28 there are provided fastening and clamping arrangements 40 with the aid of which the second workpiece part 26 can be fastened to the third workpiece carrier 28. The clamping arrangements 22 and 40 on the second and third workpiece carriers, 14 and 28 respectively, are of controllable, that is to say remotely actuatable, construction and contain locking parts 42 and 44 respectively, which can engage in a locking manner in corresponding cut-out portions 46 and 48 respectively, in the workpiece part 26 or in a fastening element 50 connected to the latter. The fastening elements 50 are pillar-like, fit into the cut-out portions 32 in the third workpiece carrier 28 and are fastened to the second workpiece part 26 in an adjustable manner. By suitable switching-over of the clamping arrangements 22 and 40, it is thus possible for the second workpiece part 26 to be selectively attached, either to the second workpiece carrier 14 by means of the clamping arrangements 22 alone, or else to the third workpiece carrier 28 by means of the clamping arrangements 40 alone. It is also possible for both the clamping arrangements 22 and 40 to be operative and locked as shown in the drawings.

Insulating means are provided in order to electrically insulate the second workpiece part 26 from the frame when it is fastened to the third workpiece carrier 28. Insulation of this kind, and the electrical contact which must also be produced with the spark-erosion operating voltage to be tapped at the connection head 34, can be accomplished in various ways. In the form of construction illustrated, provision is made for the fastening elements 50 to serve as insulating means and to be made of insulating material for this purpose.

Adjustable adapting means are associated with the clamping arrangements 22 and 40, in order to be able to align the second workpiece part 26 and in order to achieve the same clamped-in positions when changing over from attachment to the second workpiece carrier 14 to attachment to the third workpiece carrier 28. These adapting means are indicated in FIG. 1 in the form of clamping screws 52 and 54, by means of which, respectively, the clamping arrangements 22 can be fixedly clamped, in a selected position, to the second workpiece carrier 14, and the fastening elements 50 working in conjunction with the clamping arrangements 40 can be fixedly clamped, in a selected position, to the second workpiece part 26.

After each spot-grinding or erosion process, the second workpiece part 26 can, if it is fastened to the second workpiece carrier 14 alone by suitable controlling of the clamping arrangements 22 and 40, be made easily accessible through the folding outwards of the second workpiece carrier 14 into the position illustrated in FIG. 5, with the result that machining processes, and in particular the removal of material by grinding, filing and the like, can be performed in a convenient manner. In order to be able also to perform operations of this kind on the first workpiece part 24 in a convenient manner, the first workpiece carrier 4 can be extended sideways out of the frame 2 and into the position shown in FIG. 5, on a side-frame 56, in the manner known from spot-grinding presses. For this purpose, horizontal rails 58 and a horizontal-drive arrangement (not illustrated) are provided. In order to make extension possible, the vertical guide strips 6 can be moved upwards, by means of an adjusting arrangement 60 for the guide strips which operates hydraulically in this case, to the extent where the first workpiece carrier 4 resting on the horizontal rails 58 is released for the horizontal movement.

In the form of construction illustrated, the first workpiece carrier 4 is provided with side walls 62, 64, and thus forms a trough which is open in the upward direction. The longitudinal side walls 64 are pivotable in hinges 66 and can be moved away, by means of pivoting arrangements which are not illustrated but which operate, for example, electrically or pneumatically or, in particular, hydraulically, into a folded-away position in which the workpiece part 24 is easily accessible. A liquid dielectric can be poured into, or drawn off from, the trough via lines which are not shown. As in the case or ordinary spark-erosion machines, a circuit may be provided for the liquid dielectric; this circuit contains pumps, filters and the like. These arrangements are of the conventional type and will therefore not be illustrated or described any further here. Since the trough formed by the first workpiece carrier 4 is mobile, suitable mobile supply lines are present when the above-mentioned circuit is used. The lines in question here may be both flow-medium lines, that is to say if the dielectric circuit is disposed in a stationary manner, for example is incorporated in the frame 2, and electrical lines if the dielectric circuit is connected to the lower workpiece carrier 4 and is mobile.

The installation is controlled from a control panel 68 which in this case is disposed beside the frame 2 on a cabinet 70, in which the essential electrical parts of the spark-erosion arrangement are accommodated. Lines 72 and 74 lead from the cabinet 70 to the connection head 34 and to the associated driving arrangement 38, respectively. The working operations which normally occur can be initiated automatically by follow-up control systems or selectively and individually by hand, while corresponding reciprocal locking systems ensure that no dangerous or undesirable operational conditions occur. The provision of control arrangements of this kind and other details of the invention is easily possible for the specialist; more specific descriptions of such details will therefore be dispensed with here.

Figure 3:
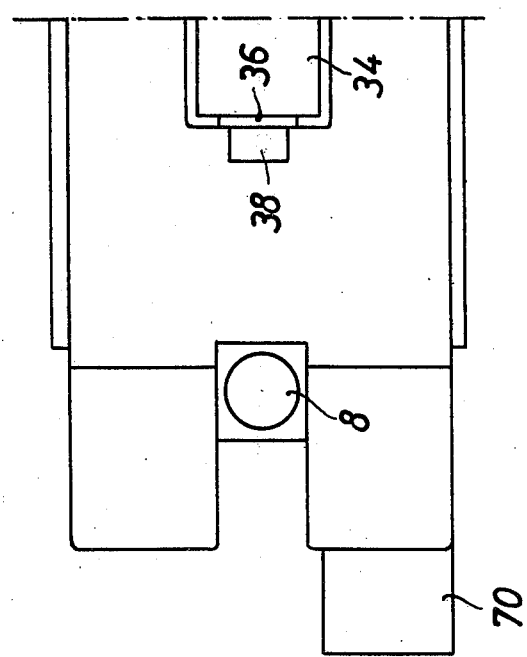
FIG. 3 is a diagrammatic, simplified elevation of the device in FIG. 1, viewed in the direction of the arrow III.

The following processes, in particular, are possible for the purpose of operating the device according to the invention:

1. ordinary spot-grinding: in this case, the second workpiece carrier 14 is released from the connection head 34 of the spark-erosion arrangements by releasing the clamping arrangements 40 (hydraulic retraction of the locking parts 44), and is fastened to the second workpiece carrier 12 only by means of the clamping arrangements 22. The head 34 is moved away slightly in the upward direction with the aid of the driving arrangement 38. The first workpiece carrier 4 is moved upwards by means of the hydraulic cylinders 8 and 10 and the lower workpiece part 24 attached to the said carrier is pressed against the upper workpiece part 26. The first workpiece carrier 4 is thereupon moved back again into its lower, starting position, the driving means 12 are released, the vertical guide strips 6 are moved upwards with the aid of their adjusting arrangement 60, and the first workpiece carrier 4 is moved out of the frame 2 on the horizontal rails 58 into the position illustrated in FIG. 5. If necessary, the second workpiece carrier 14 is pivoted into the position illustrated in FIG. 5, by means of the hydraulic cylinder 16 (FIGS. 2 and 3). Both workpiece parts can then conveniently be inspected and machined. For the purpose of further spot-grinding, the two workpiece carriers 4 and 14 are moved back into their positions in which they are retracted into the frame 2, the vertical guide strips 6 are moved downwards, the driving means 12 are actuated, and the first workpiece carrier 4 is moved upwards again by means of the hydraulic cylinders 8 and 10.

2. spot-grinding by spark-erosion: for this purpose, the connection head 34 is moved downwards by means of its driving arrangement 38, and the locking parts 44 are moved into the locking position. As soon as this is verified, which process may take place automatically in known manner, the locking parts 42 are moved into the release position and the connection head 34 is moved downwards until a distance which is adequate for reliable electrical insulation is obtained between the second workpiece part 26 and the parts of the frame 2. The two side walls 64 are pivoted inwards into the closing position, and the desired quantity of liquid dielectric is introduced. So as not to have to make the clearance for movement of the drive arrangement 38 unnecessarily large, the first workpiece carrier 4 is thereupon moved, by means of the cylinders 8 and 10, into a higher position, and is fixed in the said position. The connection head 34 is then moved further downwards, and the electrical power, which is made available by the spark-erosion arrangement and is suitably adjusted, is applied to the workpiece parts 24 and 26. The spot-grinding operation using spark-erosion then takes place, with the movement processes controlled by the driving arrangement 38. For checking and/or mechanical refinishing, the first workpiece carrier 4 is lowered, in a manner similar to that involved in ordinary mechanical spot-grinding presses, after the electrical power source has been switched off, the dielectric is discharged, the side-walls 64 are pivoted away, the driving means 12 are released, the vertical guide strips 6 are moved upwards, and the first workpiece carrier 4 is moved out of the frame 2 into the position illustrated in FIG. 5. In addition, the connection head 34 is moved upwards, preferably simultaneously, until the second workpiece part 26 lies against the second workpiece carrier 14, and the clamping arrangements 22 are actuated by advancing their locking parts 42. After the second workpiece part 26 has been fastened to the second workpiece carrier 14 in this way, and this attachment has been checked, the clamping arrangements 40 are released by retraction of their locking parts, the connection head 34 is moved away in the upward direction, and the second workpiece carrier 14 is pivoted out of the frame 2 and into the position shown in FIG. 5. Those parts of the workpiece parts which have been machined by spark-erosion are checked and, according to the findings, are mechanically refinished, for example ground down by hand, as a result of which the time involved in spot-grinding by spark-erosion can be considerably reduced. It can also be decided, on the basis of the condition of the machined parts, whether the spark-erosion operating voltage should be reversed in its polarity and/or altered.

For the purpose of moving back into the operating position for spark-erosion, the processes described are carried out in the analogously reversed sequence.

Other forms of construction are possible, without departing from the scope of the invention. In particular, the second workpiece carrier may likewise, or even instead of the first workpiece carrier, be movable towards and away from the latter in the path of motion. It is possible, particularly in a form of construction of this kind but also in other cases, for the third workpiece carrier to be mounted and guided in the second workpiece carrier; this facilitates the maintenance of a high degree of positional accuracy in the switching-over of the clamping means. In this event, the third workpiece carrier accompanies the second workpiece carrier in its movement. Furthermore, of course, the third workpiece carrier may also constitute a component of the device which is integrated with the spark-erosion connection head.

What is claimed is:

1. Apparatus for selectively machining first and second interfitting parts by mechanical means and spark-erosion means comprising, in combination, a supporting frame, first support means for said first part, means movably mounting said first support means upon said frame for transfer of said first support means between a first mechanical machining means access position and a second spark-erosion machining position, second support means for said second part, means movably mounting said second support means on said frame for transfer of said second support means toward and away from said first support means when in said second position, and movable between a first mechanical machining means access position and a second spark-erosion machining position, said first and second support means being aligned with each other when in said second position, motor means mounted on said frame operatively connected to said first and second support means for transferring said first and second support means upon their associated movable mounting means, and spark-erosion means electrically connectable to said parts whereby said parts may be machined by spark-erosion when said first and second support means are in said second machining positions.

2. Apparatus for selectively machining first and second interfitting parts as in claim 1 wherein said first support means comprises a table mounted upon guides for positioning said table between said first and second first support means positions, and guide means mounted upon said frame transversely disposed to said guides permitting movement of said table when at said second position toward said second support means.

3. Apparatus for selectively machining first and second interfitting parts as in claim 1, first part fastening means mounted upon said second support means selectively releaseably connecting said second part with said second support means.

4. Apparatus for selectively machining first and second interfitting parts as in claim 3, second releaseable fastening means mounted on said second support means selectively fastening said second part to said second support means.

5. Apparatus for selectively machining first and second interfitting parts as in claim 1, pivot means mounted on said frame pivotally supporting said second support means on said frame for positioning between said first and second positions thereof.

6. Apparatus for selectively machining first and second interfitting parts as in claim 1, spark-erosion part translating means mounted upon said frame selectively connectable to an interfitted part for translating said part toward said first support means when in said second position to accurately translate said part to be interfitted during spark-erosion machining.

7. Apparatus for selectively machining first and second interfitting parts as in claim 1, a liquid receiving trough defined on said first support means for receiving a dielectric fluid during spark-erosion machining.

* * * * *